United States Patent [19]

Italy et al.

[11] 4,094,144
[45] June 13, 1978

[54] HYDRAULIC PRESSURE REGULATING ARRANGEMENT

[75] Inventors: Pavel Italy; Ondrej Kilik; Jozef Barancok, all of Nova Dubnica; Anton Miski, Dubnica nad Vahom, all of Czechoslovakia

[73] Assignee: Strojarske a metalurgicke zavody, Dubnica nad Vahom, Czechoslovakia

[21] Appl. No.: 778,136

[22] Filed: Mar. 16, 1977

[51] Int. Cl.² .............................................. F16H 39/46
[52] U.S. Cl. ........................................ 60/445; 60/452; 60/465; 60/488
[58] Field of Search ................. 60/387, 389, 445, 465, 60/469, 488, 452, 468, 494

[56] References Cited

U.S. PATENT DOCUMENTS

| 2,821,173 | 1/1958 | Adsit | 60/387 X |
| 3,685,290 | 8/1972 | Krusche | 60/452 |

*Primary Examiner*—Edgar W. Geoghegan
*Attorney, Agent, or Firm*—Burgess, Ryan and Wayne

[57] ABSTRACT

A constant pressure at the output of a pressure regulator is adjusted to and maintained at a required value by hydraulic remote control of a sliding valve in operative association with a control cylinder responsive to actual pressure conditions. The position of the piston of the control cylinder is determined both by a pilot pressure and by the pressure prevailing at the output of the regulator.

6 Claims, 5 Drawing Figures

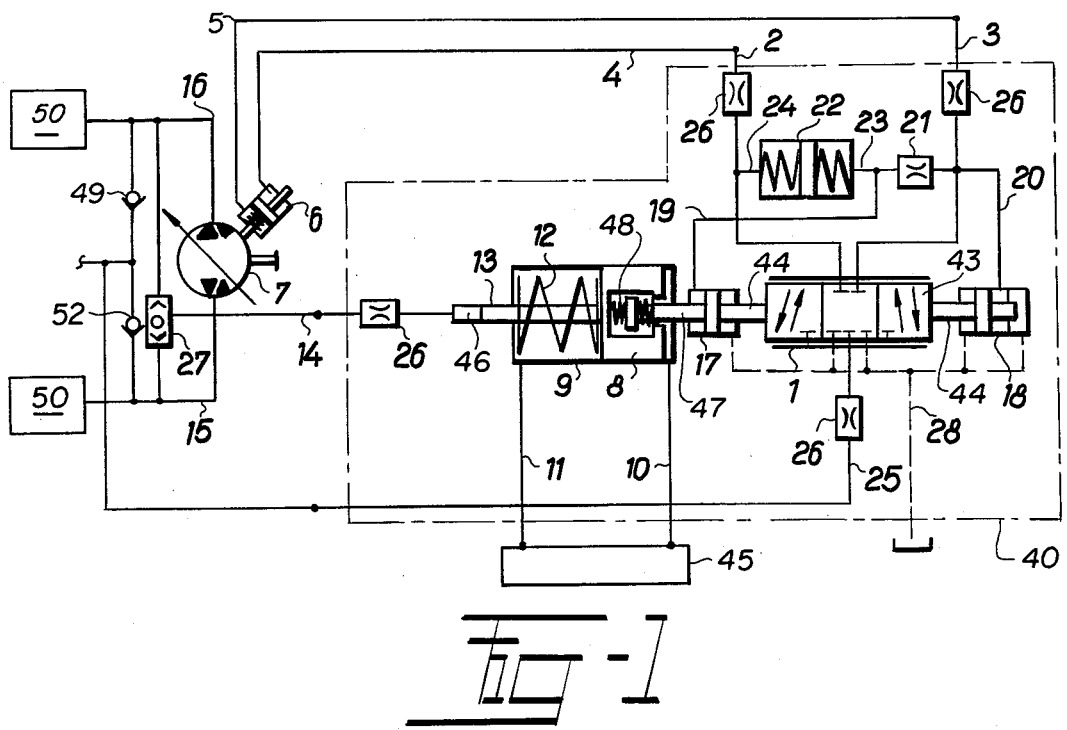
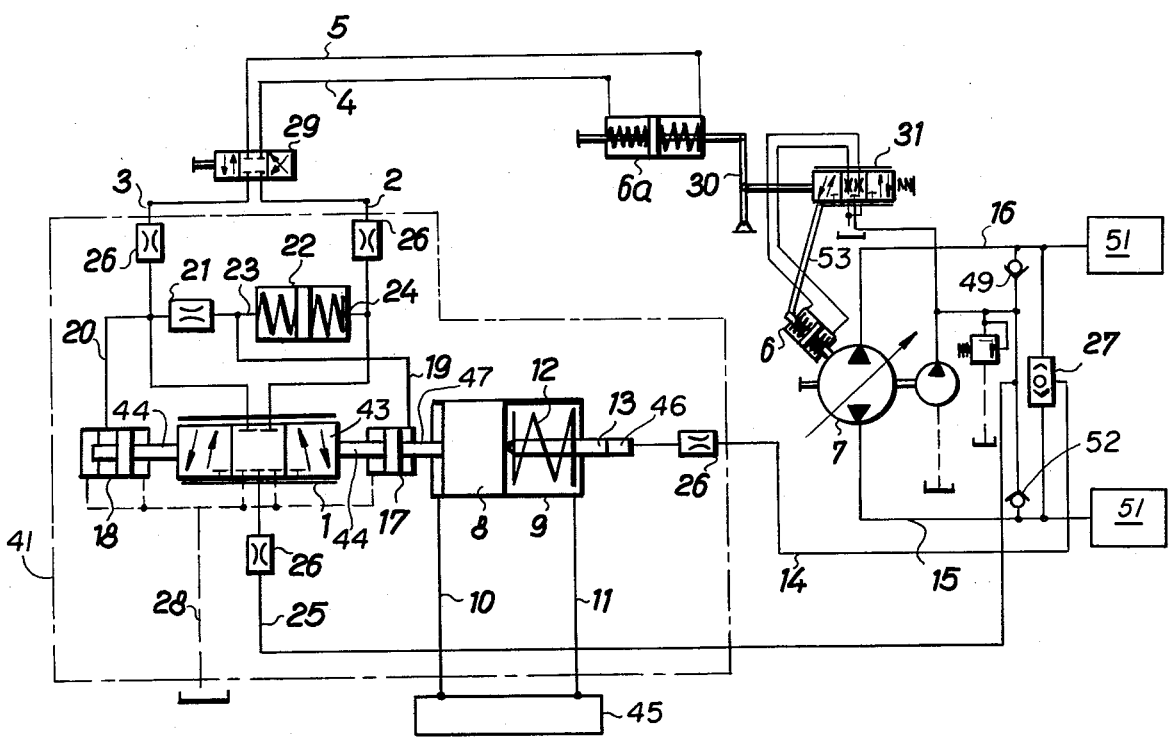

HYDRAULIC PRESSURE REGULATING ARRANGEMENT

BACKGROUND OF THE INVENTION

This invention relates to a hydraulic pressure regulator for automatic regulation of hydrostatic converters to a constant pressure with hydraulic remote control.

Hydrostatic transmissions comprising regulated or unregulated hydrogenerators and hydromotors, are characterized by high efficiency, long life, high reliability, small mass and dimensions and above all by the capability for continuous regulation of the transmission ratio. Their advantages are, however, most apparent when automatically regulated. The automatic regulation of a hydrostatic transmission to a constant torque by regulation of a hydrostatic regulating converter on the generator or motor side, and regulation to a constant power by regulation of a hydrostatic regulating converter on the motor side, are the two main regulation schemes employed in hydrostatic transmissions which can be realized by regulation of the transmission pressure. In most applications, particularly where power transmissions handling more than 30 kilowatts are involved, and also in the case of inverse power transmissions, it is advantageous to employ a closed hydrostatic transmission incorporating an auxiliary complementary low pressure hydrogenerator.

Known arrangements for automatically regulating the torque and the power output of hydrostatic converters by regulation of the pressure of the hydrostatic transmission are provided by feeding them liquid directly from the output of the regulating hydrogenerator or employing a special construction of the control cyclinder. These techniques are suitable for regulation to a constant pressure value, but do not enable the required pressure value to be remotely controlled.

A drawback of these known arrangements is that the regulation of the control pressure directly at the output of the regulating hydrogenerator is rather difficult due to the high operating pressures. Another drawback of these arrangements is that they are not functionally compatible with other types of regulation, in which low operating pressure servocylinders for the control of the geometrical liquid volume of converters, and auxiliary low pressure hydrogenerators are used. Another drawback of the prior art arrangements is that they can only adjust a single pressure value and do not provide for remote or programmed adjustment of the required pressure value, which is particularly important where mobile working machines are involved.

Accordingly, it is an object of the present invention to eliminate or at least reduce drawbacks of prior art arrangements, and to provide a hydraulic pressure regulator for automatic regulation of hydrostatic converters to a chosen constant pressure. It is another object of the invention to provide an arrangement which facilitates remote control of the hydraulic pressure.

As herein described, there is provided an arrangement for automatically controlling hydraulic pressure, comprising: a hydraulic pressure regulator, a pressure regulator having an inlet and outlet pressure conduit, a servocylinder coupled to said regulator and having a control piston to control the fluid volume thereof, a slide valve having an inlet conduit and a piston, first and second outlet conduits, a control cylinder having a control pressure inlet and outlet, a piston within said control cylinder connected to the piston of said slide valve, a spring within said control cylinder acting on said piston thereof in one direction, a plunger connected to said control cylinder piston, a double acting return valve connected between the inlet and outlet pressure conduits of the pressure regulator, said valve controlling via a pressure conduit the position of said plunger, the first and second outlet conduits of the slide valve being connected to the servocyinder of the pressure regulator.

An advantage of the circuit arrangement of the hydraulic pressure regulator according to the present invention is that it is relatively simple and not demanding in dimensions and manufacture. The invention is particularly suitable for use in hydrostatic transmissions utilizing an auxiliary complementary hydrogenerator as the pressure source. The invention enables the unification of the regulator design with other regulating arrangements, and provides for remote or programmed adjustment of the required pressure to enable realization of a fully automated hydrostatic transmission with a regulating converter on the motor side, particularly for application at mobile working machines.

The regulator of the present invention does not employ mechanical position feedback, but rather utilizes hydraulic dynamic feedback from the outlet pressure drop.

A preferred embodiment of a hydraulic pressure regulator according to the present invention is hereafter described with reference to the accompanying drawings in which:

FIG. 1 shows a pressure regulator according to a preferred embodiment of the invention, comprising a slide valve elastically coupled to a control cylinder associated with a hydrostatic converter on the motor side, with direct control of servocylinders of the converter to control the geometric liquid volume thereof.

FIG. 2 shows a pressure regulator according to an alternative embodiment of the invention, comprising a slide valve rigidly coupled to a control cylinder associated with a reversible regulating hydrogenerator, with indirect control of servocylinders of the converter to vary its geometric liquid volume.

Figure 3:
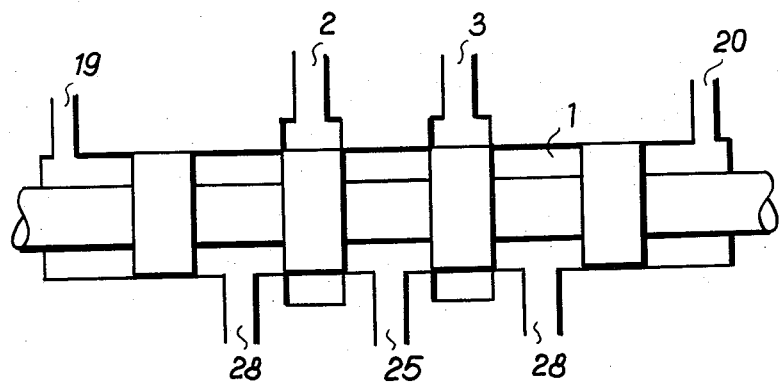
FIGS. 3, 4 and 5 are diagrams illustrating different working positions of the slide valve.
Figure 4:
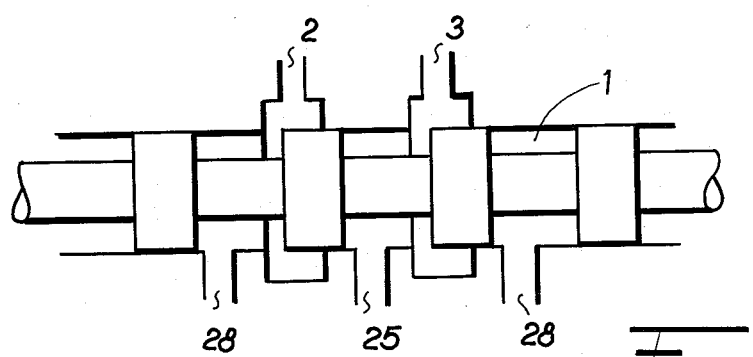
Figure 5:
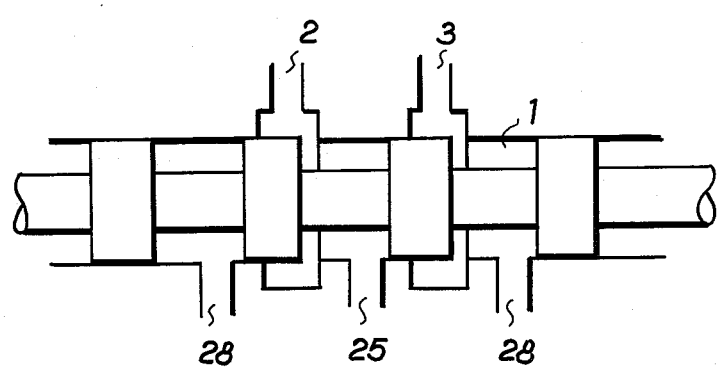

The arrangements shown in FIGS. 1 and 2 represent fluid control or logic systems utilizing conventional fluid logic or hydraulic elements interconnected in a novel manner. Each of the elements shown in FIGS. 1 and 2 is a commercially available fluid logic or hydraulic device which is well known in the art. The solid lines shown joining the various elements represent fluid or hydraulic conduits.

The elements 26 shown in FIGS. 1 and 2 are restrictions which increase the resistance to fluid flow of the conduits in the path of which they are situated. The elements 22 represent hydraulic accumulators which are capable of changing in volume to accommodate sudden increases and decreases of the pressure differential between the conduits to which they are connected.

The slide valves 1 are essentially fluid switches, responsive to axial position of the control piston 43 and associated piston rod 44. The slide valve 1 has a pressure input line 25, a return line 28, and two pressure output lines 2 and 3, with restrictions 26 in the path of the lines 25, 2 and 3. With the piston 43 of the slide valve 1 in a central or neutral position, hydraulic fluid is prevented from exiting through the output lines 2 and 3. With the piston 43 moved to the left, hydraulic fluid (hereafter referred to as "fluid") enters the valve 1 through the line 25, passes through the output line 2, through a fluid circuit external to the valve 1 to return through the output line 3, through the slide valve 1, and through the return line 28. With the piston 43 moved to the right of the center or neutral position, fluid entering through the line 25 exits through the outlet line 3, and returns through the line 2 by way of an external fluid circuit, passes through the slide valve again and through the return line 28. Thus, depending upon the position of the piston 43, fluid provided by the line 25 passes through a circuit including the lines 2 and 3 in either a clockwise or counterclockwise direction.

The damping cylinders 17 and 18 permit fluid to move through them, while limiting the rate of flow when accompanied by sudden changes in fluid pressure. In effect, the cylinders 17 and 18 act as shock absorbers for the purpose of providing smooth changes in hydraulic pressure in response to sudden mechanical movements of the piston rod 44 to which they are connected.

The hydrostatic pump 7 has inlet and outlet lines 15 and 16 communicating with an inner chamber, the volume of which is defined by a piston whose position is controlled by the servocylinder 6. Thus, depending upon the position of the slide valve 1, the position of the piston within the servocylinder 6 coupled to lines 2 and 3 varies to control the pressure in lines 15 and 16.

The pressure regulator of the invention is shown within the dashed lines 40 of FIG. 1 and 41 of FIG. 2. The regulators 40 and 41 are designed for controlling the hydrostatic converter 7 in order to regulate the pressure in the conduits 15 and 16 connected to the pump 50, or to the hydromotor 51.

A control unit 45, which may if desired be remotely situated, supplies fluid to a control cylinder 9 via a feed line 10 and return line 11, the pressure differential between the lines 10 and 11 corresponding to a desired pressure in the lines 15 and 16 associated with the hydrogenerator 50 and hydromotor 51 respectively.

The control cylinder 9 has an input hydraulic cylinder 46, a piston 8, a plunger 13 connecting the piston 8 with the piston of the cylinder 46, and an output rod 47 coupled at one end to the slide valve rod 44 through the damping cylinder 17, and coupled at the other end to the piston 8 through a resilient coupling 48.. A prestressing comparison spring 12 urges the piston 8 toward the slide valve 1.

A fluid sample under the same pressure as that in whichever of lines 15 and 16 has the higher pressure is coupled to the hydraulic cylinders 46 via a conventional double acting return valve 27, conduit 14, and restriction 26. The valve 27 couples the conduit 14 to whichever of lines 15 and 16 has the higher pressure. Thus, a force is applied to the plunger 13 by the cylinder 46 which is proportional to the pressure in whichever of lines 15 and 16 has the higher pressure i.e. the pressure to be regulated.

Fluid for the supply line 25 of the slide valve 1 is derived from lines 15 and 16 through check valves 52 and 49 respectively.

Thus it is apparent that three primary forces act concurrently upon the piston 8 of the control cylinder 9, viz, (1) the force exerted by the comparison spring 12, (2) the hydraulic force exerted on piston 8 by fluid from the control unit 45, tending to drive piston 8 to the left, and (3) the mechanical force exerted on piston 8 by plunger 13, proportional to the pressure in lines 15 and 16 to be regulated and tending to drive piston 8 to the right. In response to these concurrently applied forces, the piston 8 assumes an equilibrium position, and, via the rod 47, damping cylinder 17 and rod 44, causes the slide valve piston 43 to assume a corresponding position. As a result, the flow of fluid in lines 2 and 3 to the servocylinder 6 is controlled to correspondingly increase or decrease the pressure in lines 15 and 16 to the desired value, i.e. corresponding to the differential pressure between lines 10 and 11. Once the pressure in lines 15/16 has achieved the desired value, the piston 8 assumes an equilibrium position corresponding to the center or neutral position of the slide valve piston 43, and no further fluid flow occurs in the output lines 2 and 3, so that no further movement of the piston of the servocylinder 6 occurs.

When the desired pressure supplied to the control cylinder 9 through lines 10 and 11 is decreased, the cylinder 8 moves to the right, causing fluid to flow from the line 25 through the output line 3 and to return through the output line 2, thus moving the piston of the servocylinder 6 away from the hydrostatic pump 7 to increase the volume of the regulating chamber therein and thus decrease the pressure in lines 15 and 16 until, as previously described, the desired equilibrium condition is reached.

Similarly, when an increased pressure differential between lines 10 and 11 is supplied by the control unit 45, the piston 8 moves to the left, also moving the piston 43 of the slide valve 1 to the left and causing fluid to flow from the line 25, through the output line 2, the servocylinder 6, and return through output line 3, thus driving the piston of the servocylinder 6 toward the hydrostatic pump 7 to decrease the volume of the regulating chamber therein and correspondingly increase the pressure in lines 15 and 16 until the desired equilibrium condition is reached.

Any sudden pressure changes, sudden mechanical movements or oscillations which may tend to occur when the pressure supplied by the control unit 45 changes with respect to the pressure in lines 15/16, is moderated and damped by the resilient coupling 48, damping cylinders 17 and 18, accumulator 22, and restrictions 26.

As seen in FIGS. 1 and 2, the damping cylinders 17 and 18 have centrally located pistons with fluid chambers on each side thereof. Cross coupling or feedback between the chambers of the damping cylinders remote from the slide valve 1 is provided by the conduits 19 and 20 and the restriction 21, which provides a damping effect. The restriction 21 and accumulator 22 are also connected in series between the slide valve outlet lines 2 and 3 to provide damping of fluid pressure variations in said lines.

In FIG. 2, components having the same numbers as corresponding components of FIG. 1 are identical, and function in the same manner. In FIG. 2, the rod 47 is rigidly connected to the piston 8, rather than being connected through a resilient coupling 48 as in FIG. 1. Otherwise, the regulating arrangement of FIG. 2 operates in substantially the same manner as that of FIG. 1, except that (i) the piston of the servocylinder 6 is not only hydraulically movable, but a mechanical force may also be applied thereto by means of a rod 53 coupled to the piston of an auxiliary slide valve 31, which functions substantially in the same manner as the slide valve 1, (ii) the piston of the slide valve 31 is driven by an auxiliary servocylinder 6a through a mechanical linkage 30, and (iii) the output lines 2 and 3 of the slide valve 1 are coupled to the auxiliary servocylinder 6a through a hydraulic distributor 29. The distributor 29 is a conventional fluid logic circuit which interconnects the output lines 4 and 5 with the output lines 2 and 3, in a manner depending upon which of the lines 4 and 5 has the higher pressure. That is, when the pressure in line 3 is higher than line 2, and the pressure in line 5 is higher than line 4, lines 3 and 5, and lines 4 and 2 are interconnected. When the pressure in line 3 is higher than line 2, and the pressure in line 4 is higher than line 5, lines 3 and 4, and 5 and 2 are interconnected. When line 2 has a higher pressure than line 3, and line 4 has a higher pressure than line 5, lines 2 and 4, and lines 5 and 3 are interconnected. When line 2 has a higher pressure than line 3, and line 5 has a higher pressure than line 4, lines 2 and 5 and lines 4 and 3 are interconnected. As previously mentioned, the distributor 29 is a fluid logic circuit which performs the aforementioned functions, and such devices are well known in the art and are commercially available.

The arrangement shown in FIG. 2 allows an external mechanical force to be applied through the linkage 30, by an operator or a mechanical device, to enable the regulating system to be combined with such mechanical control elements.

The automatic hydraulic pressure regulator herein described has useful applications in automatic hydraulic regulating circuits where pressure regulation of hydraulic transmissions is required, for instance for regulation of a regulating hydromotor of a hydrostatic regulating transmission as part of an automatic regulation to a constant output of a driving source for mobile earth working machines and working machines in the building trade. While oil is preferred as the working fluid, other suitable liquids could also be employed.

What is claimed is:

1. An arrangement for automatically controlling hydraulic pressure, comprising: a hydrostatic pump having an inlet and outlet pressure conduit, a servocylinder coupled to said hydrostatic pump and having a control piston to control the fluid volume thereof, a slide valve having an inlet conduit, a piston, and first and second outlet conduits, a control cylinder having a control pressure inlet and outlet, a piston within said control cylinder connected to the piston of said slide valve, a spring within said control cylinder acting on said piston thereof in one direction, a plunger connected to said control cylinder piston, a double acting return valve connected between the inlet and outlet pressure conduits of the hydrostatic pump, said return valve controlling via a pressure conduit the position of said plunger, the first and second outlet conduits of the slide valve being connected to the servocylinder of the hydrostatic pump.

2. The arrangement according to claim 1, wherein the slide valve piston is connected to the piston of the control cylinder by resilient means.

3. The arrangement according to claim 1, further comprising a double acting accumulator and a hydraulic resistance connected in series between the first and second outlet conduits of the slide valve, thus by-passing the servocylinder.

4. The arrangement according to claim 3, comprising damping cylinders coupled to both sides of the slide valve piston, each damping cylinder having a chamber communicating with said hydraulic resistance.

5. The arrangement according to claim 1, further comprising hydraulic resistances in the first outlet conduit and in the second outlet conduit of the slide valve, in the pressure conduit between said return valve and said plunger and in the inlet conduit of the slide valve.

6. The arrangement according to claim 1, comprising an auxiliary servocylinder coupled between said slide valve outlet conduits and said first mentioned servocylinder for controlling the movement of the control piston of said first mentioned servocylinder through a mechanical linkage.

* * * * *